(12) United States Patent
Liu et al.

(10) Patent No.: US 11,703,370 B2
(45) Date of Patent: Jul. 18, 2023

(54) METHOD AND DEVICE FOR ACCURATELY MONITORING EVAPORATION CAPACITY OF WATER SURFACE EVAPORATOR IN WHOLE PROCESS

(71) Applicant: Nanjing Hydraulic Research Institute, Nanjing (CN)

(72) Inventors: Jiufu Liu, Nanjing (CN); Zhao Cai, Nanjing (CN); Suyi Liu, Nanjing (CN); Ziyin Xie, Nanjing (CN); Weizu Gu, Nanjing (CN); Aimin Liao, Nanjing (CN); Rong Zhang, Nanjing (CN); Minhan Liao, Nanjing (CN); Hongwei Liu, Nanjing (CN); Wenzhong Wang, Nanjing (CN); Huan Wang, Nanjing (CN); Tao Ma, Nanjing (CN); Niu Wang, Nanjing (CN); Xuegang Li, Nanjing (CN); Guangxu Jiang, Nanjing (CN)

(73) Assignee: NANJING HYDRAULIC RESEARCH INSTITUTE, Nanjing (CN)

( * ) Notice: Subject to any disclaimer, the term of this patent is extended or adjusted under 35 U.S.C. 154(b) by 105 days.

(21) Appl. No.: 17/388,531

(22) Filed: Jul. 29, 2021

(65) Prior Publication Data
US 2021/0396567 A1    Dec. 23, 2021

(30) Foreign Application Priority Data
Oct. 19, 2020 (CN) .......................... 202011118108.2

(51) Int. Cl.
*G01F 23/22* (2006.01)
*G01F 1/56* (2006.01)
(Continued)

(52) U.S. Cl.
CPC ................ *G01F 23/22* (2013.01); *G01F 1/56* (2013.01); *G01F 15/005* (2013.01); *G01W 1/14* (2013.01); *Y02A 20/108* (2018.01)

(58) Field of Classification Search
CPC .......... G01W 1/00; G01W 1/14; Y02A 20/00; Y02A 20/108; Y02A 90/10; E03F 1/00
See application file for complete search history.

(56) References Cited

U.S. PATENT DOCUMENTS

| 4,380,248 A * | 4/1983 | Ambrus .................. G01W 1/00 137/428 |
| 2003/0046995 A1* | 3/2003 | Luce ....................... G01W 1/14 73/170.22 |

FOREIGN PATENT DOCUMENTS

| CN | 2275229 Y | * | 2/1998 |
| CN | 101706590 A | * | 5/2010 |

(Continued)

*Primary Examiner* — Herbert K Roberts
(74) *Attorney, Agent, or Firm* — Muncy, Geissler, Olds & Lowe, P.C.

(57) ABSTRACT

A device for monitoring evaporation capacity of a water surface evaporator in a process includes a water surface evaporator and a rain collector, the rain collector and the water surface evaporator having a same size of orifice area, height, and contour profile of a monitoring device. One side of the water surface evaporator is connected with a first measuring well through a pipeline, and another side of the water surface evaporator is connected with a first electromagnetic flowmeter, a water supplementing electromagnetic valve and an overflow electromagnetic valve through a water pipe. The water supplementing electromagnetic valve is connected with a water supplementing barrel through a water supplementing pipe. A water collecting barrel is installed below the special rain collector. A second magne- (Continued)

tostrictive water level meter, a starting drainage switch and a stopping drainage switch are installed in the second measuring well.

5 Claims, 2 Drawing Sheets

(51) Int. Cl.
*G01W 1/14* (2006.01)
*G01F 15/00* (2006.01)

(56) References Cited

FOREIGN PATENT DOCUMENTS

| | | | | |
|---|---|---|---|---|
| CN | 102749662 A | * | 10/2012 | |
| CN | 202631760 U | * | 12/2012 | |
| CN | 104977629 A | * | 10/2015 | |
| CN | 205176299 U | * | 4/2016 | |
| CN | 105987858 A | * | 10/2016 | ............... G01N 7/14 |
| CN | 106569514 A | * | 4/2017 | |
| CN | 208766316 U | * | 4/2019 | ............. G01N 33/00 |
| CN | 108896126 B | * | 9/2020 | ........... B08B 9/0936 |

* cited by examiner

METHOD AND DEVICE FOR ACCURATELY MONITORING EVAPORATION CAPACITY OF WATER SURFACE EVAPORATOR IN WHOLE PROCESS

CROSS REFERENCE TO RELATED APPLICATIONS

The present application claims priority to Chinese Patent Application No. CN 202011118108.2, which was filed on Oct. 19, 2020, the entire contents of which are hereby incorporated by reference.

Technical Field

The invention relates to a method and a device for accurately monitoring the evaporation capacity of a water surface evaporator in the whole process, and belongs to the technical field of water conservancy and meteorology.

Background Art

Water surface evaporation capacity is also a key operation monitoring object in the fields of water conservancy, meteorology, ecology, environment, etc., and also important content of research such as on the influence of land surface hydrological cycle, water resources survey and evaluation, ecological civilization construction, and climate change on the hydrological cycle. The existing water surface evaporation monitoring device has many shortcomings. For example, the monitored rainfall by a standard raingauge is used to replace the rainfall entering a water surface evaporator. For the standard raingauge, due to the size of orifice area, the height of the orifice from ground, and the great difference between the contour profile of the raingauge and the water surface evaporation monitoring device, there is a significant difference between the rainfall monitored by the raingauge and the rainfall entering the water surface evaporator, resulting in the inability to achieve accurate monitoring of the water surface evaporation capacity. Besides, the existing automatic monitoring device for the evaporation capacity of the water surface evaporator only partially realizes the automation of manual observation, the overflow flow cannot be accurately and timely measured during the rainfall and it cannot realize the accurate monitoring of the evaporation capacity of the water surface in the whole process. As a result, it is necessary to explore a perfect method and device for accurately monitoring the evaporation capacity of the water surface in the whole process.

SUMMARY OF THE INVENTION

The invention solves the technical problems as follows: the problem of the accurate monitoring of the evaporation capacity of all existing water surface evaporators in the whole process; the problem of accurate monitoring of full-automatic water supplementing and rainy day overflow amount of the existing water surface evaporation device; and meanwhile the problem of the difference of the rainfall observed values caused by different sizes of orifice area of an raingauge collector($\Phi$20 cm, i.e., in China) and a water surface evaporator ($\Phi$61.8 cm and the like), the problem of the difference of the rainfall observed values caused by different heights of the orifice of the existing standard raingauge (70 cm height away from the ground surface, i.e., in China) and the water surface evaporator (30 cm away from the ground surface), the problem of the difference of the rainfall observed values caused by different contour profiles of the raingauge and a device thereof and a water surface evaporation monitoring device.

In order to solve the above technical problems, the technical scheme proposed by the present invention is to propose a method and device for accurately monitoring the evaporation capacity of an water surface evaporator in the whole process, including steps as follows: the rainfall is collected by using one special rain collector which has the same orifice area, height of the orifice and contour profile of the monitoring device as those of a water surface evaporator, and one magnetostrictive water level meter and electromagnetic valve, an electromagnetic flowmeter and one pair of water level control switches to accurately monitor the mixing process of the rainfall and the drainage amount and the process of the drainage amount to solve the fundamental problem that the rainfall entering an evaporator is not accurately monitored by various existing water surface evaporators; meanwhile, one magnetostrictive water level meter, two electromagnetic valves, one electromagnetic flowmeter and two pairs of water level control switches are used for accurately monitoring the mixing process of the evaporation capacity, water supplementing amount, rainfall and overflow amount and the process of the overflow amount of the water surface evaporator. Coupling analysis is carried out on the five processes such that the evaporation capacity of the water surface evaporator is accurately monitored in the whole process. The invention is suitable for various existing water surface evaporators (E601, $\Phi$80, $\Phi$20, etc.), and realizes the accurate monitoring of the evaporation capacity of various existing water surface evaporators in the whole process.

The invention discloses a device for accurately monitoring the evaporation capacity of a water surface evaporator in the whole process, comprising a water surface evaporator and a special rain collector. The special rain collector and the water surface evaporator have the same size of orifice diameter, height of the orifice, and contour profile of a monitoring device; the water surface evaporator is connected with a first measuring well of the water surface evaporator through a pipeline, the other side of the water surface evaporator is connected with the water supplementing pipe and the overflow pipe through a pipe, the first electromagnetic flowmeter is connected with the pipe, the water supplementing electromagnetic valve is connected with the water supplementing pipe, and the overflow electromagnetic valve is connected with the overflow pipe; a first magnetostrictive water level meter, a starting overflow switch, a stopping overflow switch, a start water supplementing switch, and a stop water supplementing switch are installed in the first measuring well; a water collecting barrel is installed below the special rain collector, one side of the water collecting barrel is connected with a second electromagnetic flowmeter and a drainage electromagnetic valve through a drainage water pipe, the other side of the water collecting barrel is communicated with a second measuring well through a pipeline, and a second magnetostrictive water level meter, a starting drainage switch and a stopping drainage switch are installed in the second measuring well.

Preferably, the starting overflow switch senses a starting overflow water level, and when it is triggered, the overflow electromagnetic valve is opened such that an overflow process is accurately monitored through the first electromagnetic flowmeter, and stopping overflow switch senses a stopping overflow water level, and when it is triggered the the overflow electromagnetic valve is closed; the starting water supplementing switch senses a starting water supplementing water level, and when it is triggered the water supplementing electromagnetic valve is opened such that a water supplementing process is accurately monitored through the first electromagnetic flowmeter; the stopping water supplementing switch senses the stopping water supplementing water level, and when it is triggered the overflow electromagnetic valve is closed; the starting drainage switch senses a starting drainage water level, and when it is triggered, the drainage electromagnetic valve is opened such that a drainage process is accurately monitored through the second electromagnetic flowmeter, and stopping drainage switch senses a stopping drainage water level, and when it is triggered the drainage electromagnetic valve is closed.

Preferably, the size of the orifice diameter, the height of orifice from the ground, and the contour profile of the monitoring device of the special rain collector are the same as those of the water surface evaporation monitoring device. The special rain collector collects rainfall and then affluxes the water in the collecting barrel below, and the second magnetostrictive water level meter accurately monitors the mixing process of the rainfall and the drainage amount of the special rain collector; the first magnetostrictive water level meter accurately monitors the mixing process of the evaporation capacity, the rainfall and the overflow amount of the water surface evaporator.

Preferably, the size of the orifice of the special rain collector is the same as that of the water surface evaporator, and the water surface evaporator can be EB601, Φ80, Φ20 water surface evaporators.

Preferably, the water level in the water supplementing barrel should always be higher than the highest height of the orifice of the evaporator.

Preferably, the water supplementing electromagnetic valve is controlled by the starting water supplementing switch and the stopping water supplementing switch; the overflow electromagnetic valve is controlled by the starting overflow switch and the stopping overflow switch; the drainage electromagnetic valve is controlled by the starting drainage switch and the stopping drainage switch; the first electromagnetic flowmeter accurately monitors the process of the water supplementing amount and the overflow amount; the second electromagnetic flowmeter accurately monitors the process of drainage amount.

Preferably, the starting overflow switch in the first measuring well is flush with the starting overflow water level, and the starting overflow water level is sensed; the stopping overflow switch is flush with the stopping overflow water level, and the stopping overflow water level is sensed; the starting water supplementing switch is flush with the starting water supplementing water level, and the starting water supplementing water level is sensed; the stopping water supplementing switch is flush with the stopping water supplementing water level, and the stopping overflow water level is sensed; the starting drainage switch in the second measuring well is flush with the starting drainage water level and the starting drainage water level is sensed; the stopping drainage switch is flush with the stopping drainage water level and the stopping drainage water level is sensed.

In order to solve the above technical problem, another solution proposed by the invention includes a method for accurately monitoring the evaporation capacity of the water surface evaporator in the whole process comprises the following specific steps.

Step 1, as the water in the evaporation continuously evaporates in the absence of rain, the first magnetostrictive water level meter accurately monitoring the process of the evaporation capacity.

Step 2, with the continuous evaporation of the water in the water surface evaporator, the water level is reduced, and when the water level reaches a level flush with the starting water supplementing switch, the starting water supplementing switch is triggered, the electromagnetic valve is opened, the water supplementing barrel continuously supplements water to the evaporator, and the electromagnetic flowmeter accurately monitors the process of the water supplementing amount.

Step 3, when the water supplementing process continues, the water level in the water surface evaporator continuously rises, and when the water level reaches a level flush with the stopping water supplementing switch, the starting water supplementing switch is triggered, the electromagnetic valve is closed, the water supplementing process stops, and the first magnetostrictive water level meter accurately monitors the mixing process of the evaporation capacity and the water supplementing amount.

Step 4, under the condition of raining, when the water level of the water surface evaporator continuously rises to reach the starting overflow water level, the starting overflow switch is triggered followed by opening the electromagnetic valve to overflow, the first electromagnetic flowmeter accurately monitoring the process of the overflow amount.

Step 5, when the overflow process is continued, the water level of the water surface evaporator continuously falls, wherein when the water level reaches the stopping overflow water level, the stopping overflow switch is triggered to close the electromagnetic valve to stop overflowing, the first magnetostrictive water level meter accurately monitoring the mixing process of the evaporation capacity, the rainfall and the overflow amount.

Step 6, the special rain collector has the same circular port size, port height, and monitoring device profile as the surface evaporator. After rainfall occurs, the special rain collector continuously collects rainwater and enters the water collecting barrel, the water level of the second measuring well continuously rises, and the second magnetostrictive water level meter accurately monitors the rainfall process;

Step 7, when the water level of the second measuring well continuously rises to reach the starting drainage water level, the starting drainage switch is triggered followed by opening the drainage electromagnetic valve, the second electromagnetic flowmeter accurately monitoring the process of the drainage amount; when the water level of the second measuring well continuously falls to reach the stopping drainage water level, the stopping drainage switch is triggered followed by closing the electromagnetic valve to stop the drainage, the second magnetostrictive water level meter accurately monitoring the mixing process of the rainfall and drainage amount.

Step 8, under the condition of raining, the mixing process of the rainfall and drainage amount of the special rain collector is accurately monitored through the second magnetostrictive water level meter of the special rain collector, the process of the drainage amount is accurately monitored through the second electromagnetic flowmeter, and coupling analysis is carried out on the monitoring processes of the second magnetostrictive water level meter and the second electromagnetic flowmeter to realize an accurate monitoring of the process of the rainfall; the mixing process of the evaporation capacity, rainfall and overflow amount is accurately monitored through the first magnetostrictive water level meter of the water surface evaporator, the process of the overflow amount is accurately monitored by the second electromagnetic flowmeter, and coupling analysis is carried out on the monitoring processes of the first magnetostrictive water level meter and the first electromagnetic flowmeter to realize the accurate monitoring of the mixing process of the evaporation capacity and the rainfall; the accurate monitoring of the evaporation capacity process during raining is realized through the coupling analysis of a rainfall accurate monitoring process of the special rain collector and the evaporation capacity and rainfall accurate monitoring process of a water surface evaporator device.

Step 9, under the condition of no rain, the mixing process of the evaporation capacity and the water supplementing amount is accurately monitored through the first magnetostrictive water level meter of the water surface evaporator, the water supplementing amount is accurately monitored through the first electromagnetic flowmeter, and coupling analysis is carried out on the monitoring process of the first magnetostrictive water level meter and the first electromagnetic flowmeter, so that the accurate monitoring of the mixing process of the evaporation capacity and the water supplementing amount is realized, and the accurate monitoring of the evaporation capacity process in the rainless period is realized.

The invention has the following beneficial effects.

1. A special rain collector with the same size of orifice diameter as that of a water surface evaporator is disposed such that the problem of the difference of the rainfall observed values caused by different sizes of the orifice, i.e., the size of the orifice of the water surface evaporator (being Φ61.8 cm, etc.) and the size of orifice area of an existing raingauge (being Φ20 cm, i.e., in China), is solved.

2. By disposing the special rain collector with the same height of the orifice and the same contour profile of the device as those of the water surface evaporator, the problem that the wind field at the orifice area of the monitor is different, which results in the difference of rainfall observed values, because the height of the orifice (70 cm away from the ground surface) of the existing raingauge is different from the height of the orifice (30 cm away from the ground surface) of the water surface evaporator and the contour profile of the monitoring device is different is solved.

3. The rain is collected through a special rain collector. A magnetostrictive water level meter and an electromagnetic flowmeter are used for accurately monitoring the mixing process of the rainfall and the drainage amount and the process of drainage amount. Through coupling analysis carried out on the above process, the accurate monitoring of the whole process of the rainfall is realized. And the problem that measurement errors and repeatability of the existing high-resolution (0.1 mm) standard tipping bucket ombrometer do not meet the requirements of national standards is solved.

4. Through two electromagnetic valves and one electromagnetic flowmeter of the water surface evaporation monitoring device, one magnetostrictive water level meter installed in a first measuring well, and two pairs of water level control switches, the accurate monitoring of the whole processes of the mixing process of the evaporation capacity, the rainfall and the overflow amount of the water surface evaporator during raining and the mixing process of the evaporation capacity and the water supplementing amount during the rainless period are realized; through coupling analysis carried out on the above process, the accurate monitoring of the whole process of the evaporation capacity, the rainfall, and the water supplementing amount is realized.

5. Under the condition of raining, the process of the rainfall is accurately monitored through a special rain collector. By coupling with the accurate monitoring of the process of the evaporation capacity and the rainfall by the water surface evaporation monitoring device, the accurate monitoring of the process of the evaporation capacity during rain is realized.

BRIEF DESCRIPTION OF THE DRAWINGS

The present invention will be further described below in conjunction with the drawings.

DETAILED DESCRIPTION OF THE INVENTION

Embodiment 1

Hereinafter, an embodiment will be described in detail with reference to the accompanying drawing, in which an EB601 water surface evaporation monitoring device is taken as an example, but the invention is not limited to the EB601 water surface evaporation monitoring device.

Figure 1:
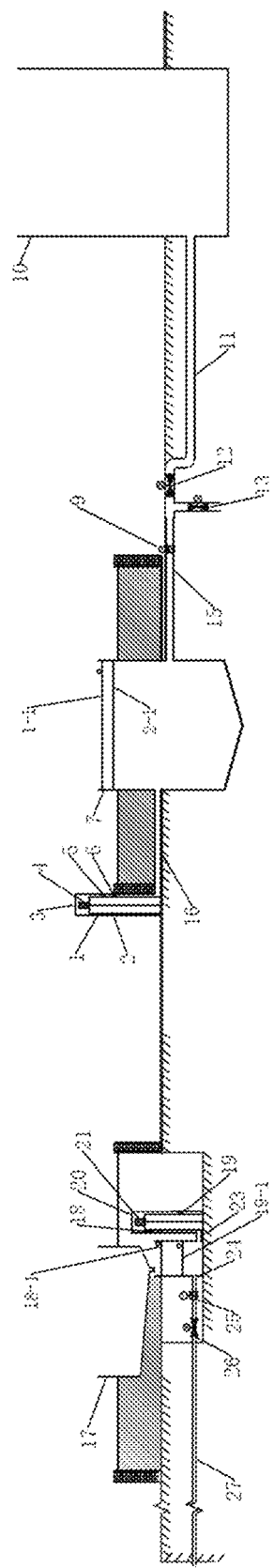
FIG. 1 is a schematic diagram of a device for accurately monitoring the evaporation capacity of a water surface evaporator in the whole process of Embodiment 1.

FIG. 1 is a schematic diagram of a method and device for accurately monitoring evaporation capacity of a water surface evaporator in the whole process.

The invention discloses a device for accurately monitoring the evaporation capacity of a water surface evaporator in the whole process, comprising a water surface evaporator 7 and a special rain collector 17. The special rain collector 17 and the water surface evaporator 7 have the same size of orifice area, height, and contour profile of a monitoring device.

The water surface evaporator 7 is connected with a first measuring well 3 of the water surface evaporator through a pipeline 16, and the other side of the water surface evaporator 7 is connected with a first electromagnetic flowmeter 9, a water supplementing electromagnetic valve 12 and an overflow electromagnetic valve 13 through a water pipe 15. A first magnetostrictive water level meter 4, a starting overflow switch 1, a stopping overflow switch 2, a starting water supplementing switch 6 and a stopping water supplementing switch 5 are installed in the first measuring well 3. The starting water supplementing switch 6 senses the starting water supplementing water level, and when it is triggered the water supplementing electromagnetic valve 12 is opened such that the water supplementing process is accurately monitored through the first electromagnetic flowmeter 9, and the stopping water supplementing switch 5 senses the stopping water supplementing water level, and when it is triggered the water supplementing electromagnetic valve 12 is closed. The starting overflow switch 1 senses a starting overflow water level 1-1, and when it is triggered, the overflow electromagnetic valve 13 is opened such that the overflow process is accurately monitored through the first electromagnetic flowmeter 9. The stopping overflow switch 2 senses a stopping overflow water level 2-1, and when it is triggered, the overflow electromagnetic valve 13 is closed.

A water collecting barrel 24 is installed below the special rain collector 17, one side of the water collecting barrel 24 is connected with a second electromagnetic flowmeter 25 and a drainage electromagnetic valve 26 through a drainage water pipe 27. The water supplementing electromagnetic valve is connected with a water supplementing barrel through a water supplementing pipe 11. The water collecting barrel 24 is communicated with a second measuring well 20 through a pipeline 23, and a second magnetostrictive water level meter 21, a starting drainage switch 18 and a stopping drainage switch 19 are installed in the second measuring well 20. The starting drainage switch 18 senses a starting drainage water level 18-1, and when it is triggered, the drainage electromagnetic valve 26 is opened such that the drainage process is accurately monitored through the second electromagnetic flowmeter 25. The stopping drainage switch 19 senses a stopping drainage water level 19-1, and when it is triggered, the drainage electromagnetic valve 26 is closed.

The size of the orifice area, the height, and the contour profile of the monitoring device of the special rain collector 17 are the same as those of the water surface evaporation monitoring device. The special rain collector 17 collects rainfall and then enters the water collecting barrel 24 below, and the second magnetostrictive water level meter 21 accurately monitors the mixing process of the rainfall and the drainage amount of the special rain collector 17. The first magnetostrictive water level meter 21 accurately monitors the mixing process of the evaporation capacity and the water supplementing amount, and the mixing process of the evaporation capacity, the rainfall and the overflow amount of the water surface evaporator 7. The water supplementing electromagnetic valve 12 is controlled by the starting water supplementing switch 6 and the stopping water supplementing switch 5. The overflow electromagnetic valve 13 is controlled by the starting overflow switch 1 and the stopping overflow switch 2. The drainage electromagnetic valve 26 is controlled by the starting drainage switch 18 and the stopping drainage switch 18. The first electromagnetic flowmeter 9 accurately monitors the process of the water supplementing amount or the overflow amount and the second electromagnetic flowmeter 25 accurately monitors the process of drainage amount.

The starting water supplementing switch 6 in the first measuring well 3 is flush with the starting overflow water level, and the starting overflow water level is sensed. The stopping water supplementing switch 5 is flush with the stopping overflow water level, and the stopping overflow water level is sensed. The starting overflow switch 1 is flush with the starting overflow water level 1-1, and the starting overflow water level 1-1 is sensed; the stopping overflow switch 2 is flush with the stopping overflow water level 2-1, and the stopping overflow water level 2-1 is sensed. The starting drainage switch 18 in the second measuring well 20 is flush with the starting drainage water level 18-1 and the starting drainage water level 19-1 is sensed. The stopping drainage switch 19 is flush with the stopping drainage water level 19-1 and the stopping drainage water level 19-1 is sensed.

Figure 2:
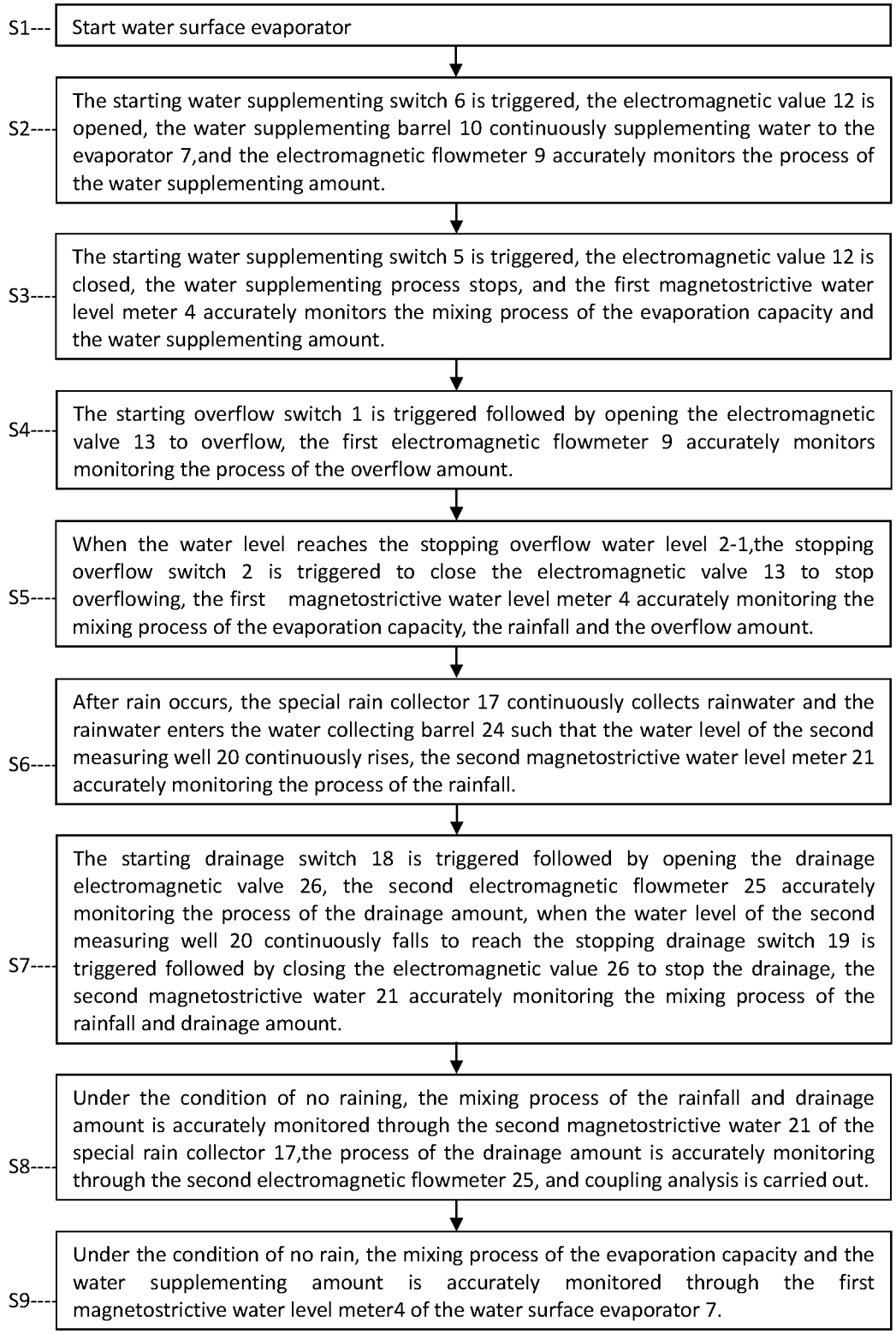
FIG. 2 is a flow chart for a method of usage of the device illustrated in FIG. 1.

The usage flow 200 (FIG. 2) of the technical device is as follows.

Step 1, the water surface evaporator 7 is started. The water in the water surface evaporator 7 continuously evaporates in the absence of rain, the first magnetostrictive water level meter 4 accurately monitoring the process of the evaporation capacity.

Step 2, with the continuous evaporation of the water in the water surface evaporator 7, the water level is reduced, and when the water level reaches a level flush with the starting water supplementing switch 6, the starting water supplementing switch 6 is triggered, the electromagnetic valve 12 is opened, the water supplementing barrel 10 continuously supplements water to the evaporator 7, and the electromagnetic flowmeter 9 accurately monitors the process of the water supplementing amount.

Step 3, when the water supplementing process continues, the water level in the water surface evaporator 7 continuously rises, and when the water level reaches a level flush with the stopping water supplementing switch 5, the starting water supplementing switch 5 is triggered, the electromagnetic valve 12 is closed, the water supplementing process stops, and the first magnetostrictive water level meter 4 accurately monitors the mixing process of the evaporation capacity and the water supplementing amount.

Step 4, under the condition of raining, when the water level of the water surface evaporator 7 continuously rises to reach the starting overflow water level 1-1, the starting overflow switch 1 is triggered followed by opening the electromagnetic valve 13 to overflow, the first electromagnetic flowmeter 9 accurately monitors the process of the overflow amount.

Step 5, when the overflow process is continued, the water level of the water surface evaporator 7 continuously falls. When the water level reaches the stopping overflow water level 2-1, the stopping overflow switch 2 is triggered to close the electromagnetic valve 13 to stop overflowing, the first magnetostrictive water level meter 4 accurately monitoring the mixing process of the evaporation capacity, the rainfall and the overflow amount.

Step 6, the special rain collector 17 has the same size of orifice diameter, the height of the orifice, and contour profile of the monitoring device as those of the water surface evaporator 7. After rain occurs, the special rain collector 17 continuously collects rainwater and the rainwater enters the water collecting barrel 24 such that the water level of the second measuring well 20 continuously rises, the second magnetostrictive water level meter 21 accurately monitoring the process of the rainfall.

Step 7, when the water level of the second measuring well 20 continuously rises to reach the starting drainage water level 18-1, the starting drainage switch 18 is triggered followed by opening the drainage electromagnetic valve 26, the second electromagnetic flowmeter 25 accurately monitoring the process of the drainage amount; when the water level of the second measuring well 20 continuously falls to reach the stopping drainage water level 19-1, the stopping drainage switch 19 is triggered followed by closing the electromagnetic valve 26 to stop the drainage, the second magnetostrictive water level meter 21 accurately monitoring the mixing process of the rainfall and drainage amount.

Step 8, under the condition of raining, the mixing process of the rainfall and drainage amount is accurately monitored through the second magnetostrictive water level meter 21 of the special rain collector 17, the process of the drainage amount is accurately monitored through the second electromagnetic flowmeter 25, and coupling analysis is carried out on the monitoring processes of the second magnetostrictive water level meter 21 and the second electromagnetic flowmeter 25 to realize the accurate monitoring of the process of the rainfall; the mixing process of the evaporation capacity, rainfall and overflow amount is accurately monitored through the first magnetostrictive water level meter 4 of the water surface evaporator device, the process of the overflow amount is accurately monitored by the second electromagnetic flowmeter 25, and coupling analysis is carried out on the monitoring processes of the first magnetostrictive water level meter 4 and the first electromagnetic flowmeter 9 to realize the accurate monitoring of the mixing process of the evaporation capacity and the rainfall; the accurate monitoring of the evaporation capacity process during raining is realized through the coupling analysis of the rainfall accurate monitoring process of the special rain collector 17 and the evaporation capacity and rainfall accurate monitoring process of the water surface evaporator device.

Step 9, under the condition of no rain, the mixing process of the evaporation capacity and the water supplementing amount is accurately monitored through the first magnetostrictive water level meter 4 of the water surface evaporator 7, the water supplementing amount is accurately monitored through the first electromagnetic flowmeter 9, and coupling analysis is carried out on the monitoring process of the first magnetostrictive water level meter 4 and the first electromagnetic flowmeter 9, so that the accurate monitoring of the mixing process of the evaporation capacity and the water supplementing amount is realized, and the accurate monitoring of the evaporation capacity process in the rainless period is realized.

The precision of the electromagnetic flowmeter is above 4/10000 and the precision of the magnetostrictive water level meter is 0.1 mm such that the accurate monitoring of the whole process of the evaporation capacity, rainfall, overflow amount, and drainage amount is guaranteed.

The method and the device provided by the invention are not limited to the specific technical scheme described in the embodiment of the EB601 water surface evaporation monitoring device, but also include water surface evaporators such as Φ80 and Φ20. All technical schemes formed by equivalent replacements are within the scope of the present invention.

The invention claimed is:

1. A device for monitoring evaporation capacity of a water surface evaporator in a process, comprising:
    a water surface evaporator;
    a rain collector, wherein the rain collector and the water surface evaporator have a same orifice diameter, orifice height, and shape,
    wherein one side of the water surface evaporator is connected with a first measuring well of the water surface evaporator through a pipeline, and the other side of the water surface evaporator is connected with a first electromagnetic flowmeter, a water supplementing electromagnetic valve and an overflow electromagnetic valve through a water pipe,
    wherein the water supplementing electromagnetic valve is connected with a water supplementing barrel through a water supplementing pipe,
    wherein a first magnetostrictive water level meter, a starting overflow switch and a stopping overflow switch, a stopping water supplementing switch and a starting water supplementing switch are installed in the first measuring well,
    wherein a water collecting barrel is installed below the rain collector, one side of the water collecting barrel is connected with a second electromagnetic flowmeter and a drainage electromagnetic valve through a drainage water pipe, the other side of the water collecting barrel is communicated with a second measuring well through a pipeline, and
    wherein a second magnetostrictive water level meter, a starting drainage switch and a stopping drainage switch are installed in the second measuring well.

2. The device for monitoring evaporation capacity of a water surface evaporator in a whole process according to claim 1, wherein the starting overflow switch is configured to sense a starting overflow water level, and when it is triggered, the overflow electromagnetic valve is configured to open such that an overflow process is monitored through the first electromagnetic flowmeter, and the stopping overflow switch is configured to sense a stopping overflow water level, and when it is triggered the the overflow electromagnetic valve is configured to close,
    wherein the starting water supplementing switch is configured to sense a starting water supplementing water level, and when it is triggered the water supplementing electromagnetic valve is configured to open such that a water supplementing process is monitored through the first electromagnetic flowmeter,
    wherein the stopping water supplementing switch is configured to sense a stopping water supplemental water level, and when it is triggered the overflow electromagnetic valve is configured to close, and
    wherein the starting drainage switch is configured to sense a starting drainage water level, and when it is triggered, the drainage electromagnetic valve is configured to open such that a drainage process is monitored through the second electromagnetic flowmeter, and stopping drainage switch is configured to sense a stopping drainage water level, and when it is triggered the drainage electromagnetic valve is configured to close.

3. The device for monitoring evaporation capacity of a water surface evaporator in a whole process according to claim 1,
    wherein the rain collector is configured to collect rain and then afflux the rain in the water collecting barrel below, and the second magnetostrictive water level meter is configured to monitor a mixing process of the rain and the drainage amount of the rain collector, and
    wherein the first magnetostrictive water level meter is configured to monitor a mixing process of the evaporation capacity, the rain and overflow amount of the water surface evaporator.

4. The device for monitoring evaporation capacity of a water surface evaporator in a whole process according to claim 1, wherein the overflow electromagnetic valve is configured to be controlled by the starting overflow switch and the stopping overflow switch,
    wherein the water supplementing electromagnetic valve is configured to be controlled by the stopping water supplementing switch and the starting water supplementing switch,
    wherein the drainage electromagnetic valve is configured to be controlled by the starting drainage switch and the stopping drainage switch,
    wherein the first electromagnetic flowmeter is configured to monitor a process of water supplementing amount and overflow amount, and
    wherein the second electromagnetic flowmeter is configured to a process of the drainage amount.

5. The device for monitoring evaporation capacity of a water surface evaporator in a whole process according to claim 1, wherein the starting overflow switch in the first measuring well is flush with the starting overflow water level, and is configured to sense a starting overflow water level,
    wherein the stopping overflow switch is flush with a stopping overflow water level, and is configured to sense the stopping overflow water level,
    wherein the starting water supplementing switch in the first measuring well is flush with a starting water supplementing water level and is configured to sense the starting water supplementing water level,
    wherein the stopping water supplementing switch is flush with a stopping water supplementing water level and is configured to sense the stopping overflow water level, the starting drainage switch in the second measuring well is flush with a starting drainage water level, and is configured to sense the starting drainage water level, and wherein the stopping drainage switch is flush with a stopping drainage water level and is configured to sense the stopping drainage water level.

\* \* \* \* \*